(No Model.)

O. E. BROWNELL.
PIANO TRUCK.

No. 306,381. Patented Oct. 14, 1884.

Witnesses:

F. C. Bryan

Dayton A. Doyle

Inventor:

Oscar E. Brownell, by C. P. Humphry

Atty.

UNITED STATES PATENT OFFICE.

OSCAR E. BROWNELL, OF AKRON, OHIO.

PIANO-TRUCK.

SPECIFICATION forming part of Letters Patent No. 306,381, dated October 14, 1884.

Application filed April 17, 1884. (No model.)

*To all whom it may concern:*

Be it known that I, OSCAR E. BROWNELL, a citizen of the United States, residing at the city of Akron, in the county of Summit and State of Ohio, have invented a new and useful Improvement in Piano-Trucks, of which the following is a specification.

My invention has relation to that class of appliances used to move pianos, and it has especial reference to devices for handling upright pianos.

The object of my invention is to provide a machine by which such pianos may be easily manipulated, in which the piano may be readily and firmly secured, and which can be quickly transferred from a sliding to a rolling truck.

Figure 1:
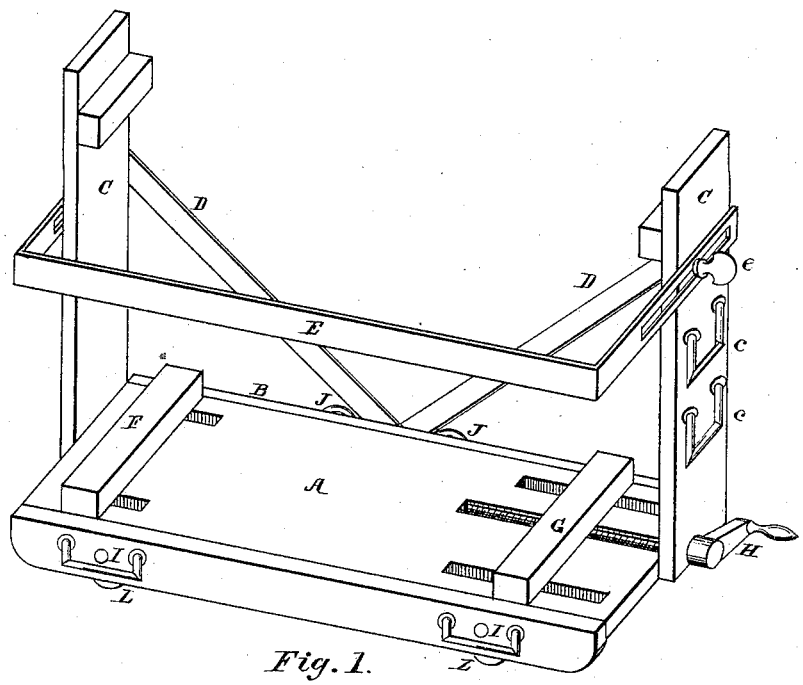
Figure 2:
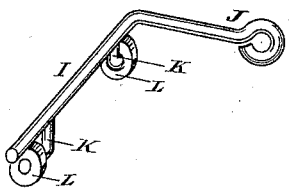

It consists in the devices illustrated in the accompanying drawings, in which Figure 1 is a perspective view of my improved upright piano-truck, and Fig. 2 a similar view of one of the rock-shafts and handle with rollers attached.

From each edge of the platform A, depend sides B, rounded upward at each end and constituting both journal-bearings for the rock-shafts I, and runners upon which the truck may slide.

Attached to each end of the platform A is an upright, C, each provided on the outside with handles c c, and between which and the platform extend diagonal bars D D, which serve as braces for the uprights and back supports for the piano.

E is an adjustable front support, the ends of which are slotted and connected with the uprights by thumb-screws e. By this arrangement the front support can be swung upward and backward to permit the piano to be loaded on the truck, and then brought over and fastened against the front, thus confining the piano securely between the back and front supports.

Upon the platform A rest two clamp-blocks, F G, the former of which is fastened thereto by bolts passing through slots, so as to render it adjustable. The block G is movable, and is controlled by the screw and handle H. The piano being placed on the platform, the block G is driven forward, clamping the casters between it and the block F, and securely attaching the piano to the platform.

Extending across near the ends of and beneath the platform and journaled in the sides B are two rock-shafts, I I, one of which is shown in Fig. 2, from the rear end of which projects at a right angle a handle, J. Projecting from each shaft are two arms, K K, the ends of which are turned parallel to the shaft I, and upon which are journaled small wheels or rollers L L. When these arms are turned downward, the wheels project below the sides and constitute rollers for the truck; but when swung upward they recede beyond the plane of the sides, permitting them to rest upon the ground.

All parts of the apparatus that come in contact with the piano should be suitably padded.

I claim as my invention—

1. A piano-truck provided with a platform having upright ends, and fixed back supports, an adjustable front support, constructed and arranged substantially as hereinbefore shown, and for the purpose specified.

2. The combination, with the platform of a piano-truck, of two clamp-blocks, one whereof is arranged to be rigidly attached to the platform, and the other adapted by devices, such substantially as shown, to be forced to and from the other, substantially as shown and for the purpose specified.

3. A piano-truck provided near each end with a rock-shaft extending beneath and across the bed thereof and journaled therein, each shaft having a handle by which it is swung, and provided with two parallel projecting arms upon each of which is journaled a wheel, all constructed and arranged substantially as shown, and for the purpose specified.

4. The herein-described piano-truck, consisting of the platform A, sides B B, uprights C C, diagonal braces D D, front support, E, blocks F G, screw H, shafts I, arms K K, and rollers L L, all constructed and arranged substantially as shown, and for the purpose specified.

In testimony that I claim the foregoing, I have hereunto set my hand this 2d day of April, A. D. 1884.

OSCAR E. BROWNELL.

Witnesses:
C. P. HUMPHREY,
E. W. STUART.